United States Patent [19]

Shigenaka

[11] Patent Number: 5,653,029
[45] Date of Patent: Aug. 5, 1997

[54] HEDGE TRIMMER DEBRIS GUIDE

[76] Inventor: Bob Shigenaka, 181 Tally Ho Rd., Arroyo Grande, Calif. 93420

[21] Appl. No.: 596,741

[22] Filed: Feb. 5, 1996

[51] Int. Cl.$^6$ .................................................. B26B 19/48
[52] U.S. Cl. .................................................. 30/132; 30/233
[58] Field of Search .......................... 30/131, 124, 286, 30/132, 233; 83/698.21

[56] References Cited

U.S. PATENT DOCUMENTS

| | | | |
|---|---|---|---|
| 2,281,189 | 4/1942 | Wright | 30/132 |
| 3,552,013 | 1/1971 | Stone | 30/132 |
| 3,711,946 | 1/1973 | Troutman | 30/132 |
| 3,795,050 | 3/1974 | Latsha | 30/132 |
| 3,916,521 | 11/1975 | Sekelsky | 30/132 |
| 5,550,109 | 8/1996 | Okonski et al. | 83/698.21 |

FOREIGN PATENT DOCUMENTS 2236937   4/1991   United Kingdom ............... 30/132

*Primary Examiner*—Hwei-Siu Payer

[57] ABSTRACT

A hedge trimmer debris guide for sweeping cut debris from a hedge. The inventive device includes a deflector panel which can be magnetically secured to a portion of a reciprocating blade structure of a hedge trimmer. The deflector panel can be arcuate in configuration to capture and retain the debris during sweeping of the trimmer during a cutting procedure for subsequent depositing of the debris into a desired container or area of a surrounding yard.

1 Claim, 3 Drawing Sheets

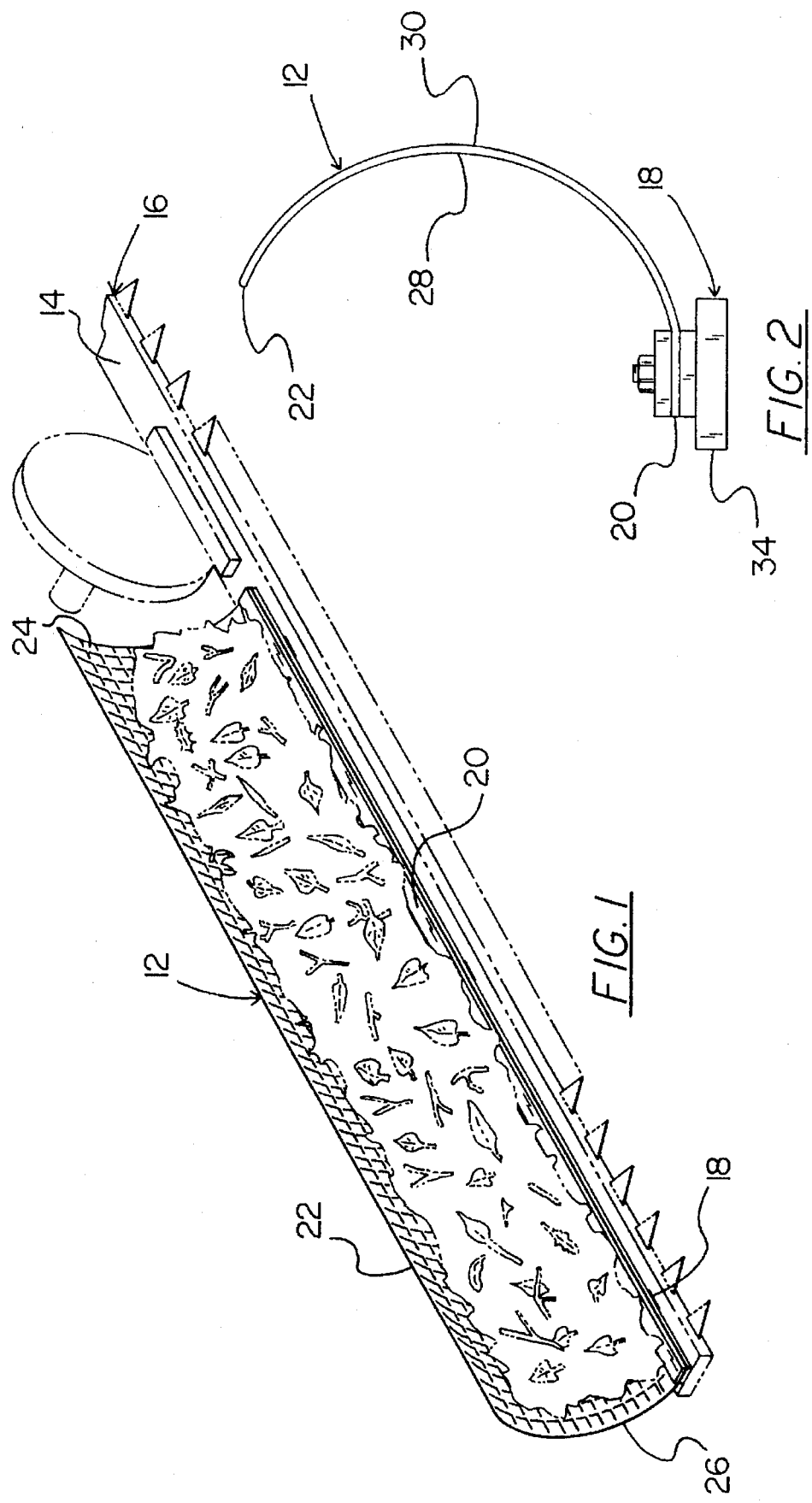

5,653,029

HEDGE TRIMMER DEBRIS GUIDE

BACKGROUND OF THE INVENTION

1. Field of the Invention

The present invention relates to hedge trimming devices and more particularly pertains to a hedge trimmer debris guide for sweeping cut debris from a hedge.

2. Description of the Prior Art

The use of hedge trimming devices is known in the prior art. More specifically, hedge trimming devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art hedge trimming devices include U.S. Pat. Nos. 3,990,145; 4,991,297; 4,641,431; 4,280,276; 4,447,953; and U.S. Pat. No. Des. 273,934.

While these devices fulfill their respective, particular objectives and requirements, the aforementioned patents do not disclose a hedge trimmer debris guide for sweeping cut debris from a hedge which includes a deflector panel magnetically securable to a portion of a reciprocating blade structure of a hedge trimmer, wherein the deflector panel can is arcuate in configuration to capture and retain debris during sweeping of the trimmer during a cutting procedure for subsequent depositing of the debris into a desired container or area of a surrounding yard.

In these respects, the hedge trimmer debris guide according to the present invention substantially departs from the conventional concepts and designs of the prior art, and in so doing provides an apparatus primarily developed for the purpose of sweeping cut debris from a hedge.

SUMMARY OF THE INVENTION

In view of the foregoing disadvantages inherent in the known types of hedge trimming devices now present in the prior art, the present invention provides a new hedge trimmer debris guide construction wherein the same can be utilized for sweeping cut debris from a hedge. As such, the general purpose of the present invention, which will be described subsequently in greater detail, is to provide a new hedge trimmer debris guide apparatus and method which has many of the advantages of the hedge trimming devices mentioned heretofore and many novel features that result in a hedge trimmer debris guide which is not anticipated, rendered obvious, suggested, or even implied by any of the prior art hedge trimming devices, either alone or in any combination thereof.

To attain this, the present invention generally comprises a hedge trimmer debris guide for sweeping cut debris from a hedge. The inventive device includes a deflector panel which can be magnetically secured to a portion of a reciprocating blade structure of a hedge trimmer. The deflector panel can be arcuate in configuration to capture and retain the debris during sweeping of the trimmer during a cutting procedure for subsequent depositing of the debris into a desired container or area of a surrounding yard.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as the do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hedge trimmer debris guide apparatus and method which has many of the advantages of the hedge trimming devices mentioned heretofore and many novel features that result in a hedge trimmer debris guide which is not anticipated, rendered obvious, suggested, or even implied by any of the prior art tool guides, either alone or in any combination: thereof.

It is another object of the present invention to provide a new hedge trimmer debris guide which may be easily and efficiently manufactured and marketed.

It is a further object of the present invention to provide a new hedge trimmer debris guide which is of a durable and reliable construction.

An even further object of the present invention is to provide a new hedge trimmer debris guide which is susceptible of a low cost of manufacture with regard to both materials and labor, and which accordingly is then susceptible of low prices of sale to the consuming public, thereby making such hedge trimmer debris guides economically available to the buying public.

Still yet another object of the present invention is to provide a new hedge trimmer debris guide which provides in the apparatuses and methods of the prior art some of the advantages thereof, while simultaneously overcoming some of the disadvantages normally associated therewith.

Still another object of the present invention is to provide a new hedge trimmer debris guide for sweeping cut debris from a hedge.

Yet another object of the present invention is to provide a new hedge trimmer debris guide which includes a deflector panel securable to a portion of a reciprocating blade structure of a hedge trimmer for sweeping debris from a hedge.

Even still another object of the present invention is to provide a new hedge trimmer debris guide wherein the deflector panel is arcuate in configuration to capture and retain the debris during sweeping of the trimmer during a cutting procedure for subsequent depositing of the debris into a desired container or area of a surrounding yard.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a hedge trimmer debris guide according to the present invention, in use.

FIG. 2 is an end elevational view of the hedge trimmer debris guide.

DESCRIPTION OF THE PREFERRED EMBODIMENT

Figure 3:
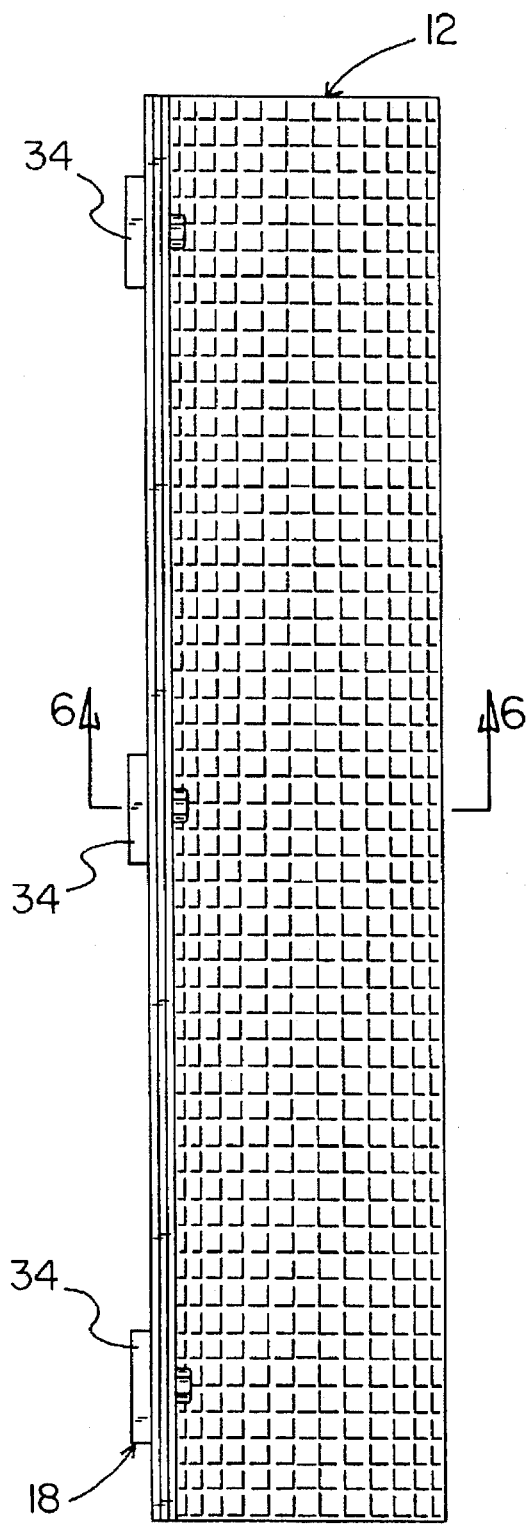
FIG. 3 is a top plan view of the invention.

With reference now to the drawings, and in particular to FIGS. 1–7 thereof, a new hedge trimmer debris guide embodying the principles and concepts of the present invention and generally designated by the reference numeral 10 will be described.

More specifically, it will be noted that the hedge trimmer debris guide 10 comprises a deflector panel 12 which can be positioned so as to extend along at least a portion of a longitudinal length of a reciprocating blade structure 14 of a hedge trimmer 16, such as is shown in connection with only a portion of the hedge trimmer illustrated in FIG. 1 of the drawings. An attaching means 18 is coupled to the deflector panel 12 and can be selectively secured to the blade structure so as to secure the device 10 relative thereto. By this structure, the hedge trimmer debris guide 10 can be easily attached to an existing blade structure and utilized to sweep cut debris from a hedge, when the trimmer is in use.

As best illustrated in FIGS. 1 and 2 of the drawings, the deflector panel 12 includes a lower longitudinal edge 20 to which the attaching means 18 are secured, and an upper longitudinal edge 22 extending in a spaced orientation relative to the lower longitudinal edge of the deflector panel 12. Inner and outer transverse edge 24 and 26 extend between the lower and upper longitudinal edges 20 and 22 to complete a definition of the outer peripheral shape of the panel 12. Preferably, a distance between the lower and upper longitudinal edges 20 and 22 is substantially greater than a width of the blade structure 14 of the hedge trimmer 16 to which the device 10 is to be associated. As shown in FIG. 2, the panel 12 is preferably shaped so as to define a concave interior surface 28 and a convex exterior surface 30. By this structure, the deflector panel 12 can be positioned so that the concave interior surface 28 thereof will face a direction of sweeping during use of the hedge trimmer to allow debris to collect within the panel 12, as shown in FIG. 1, for subsequent depositing of the debris into an adjacent container, or simply into the surrounding yard.

Figure 4:
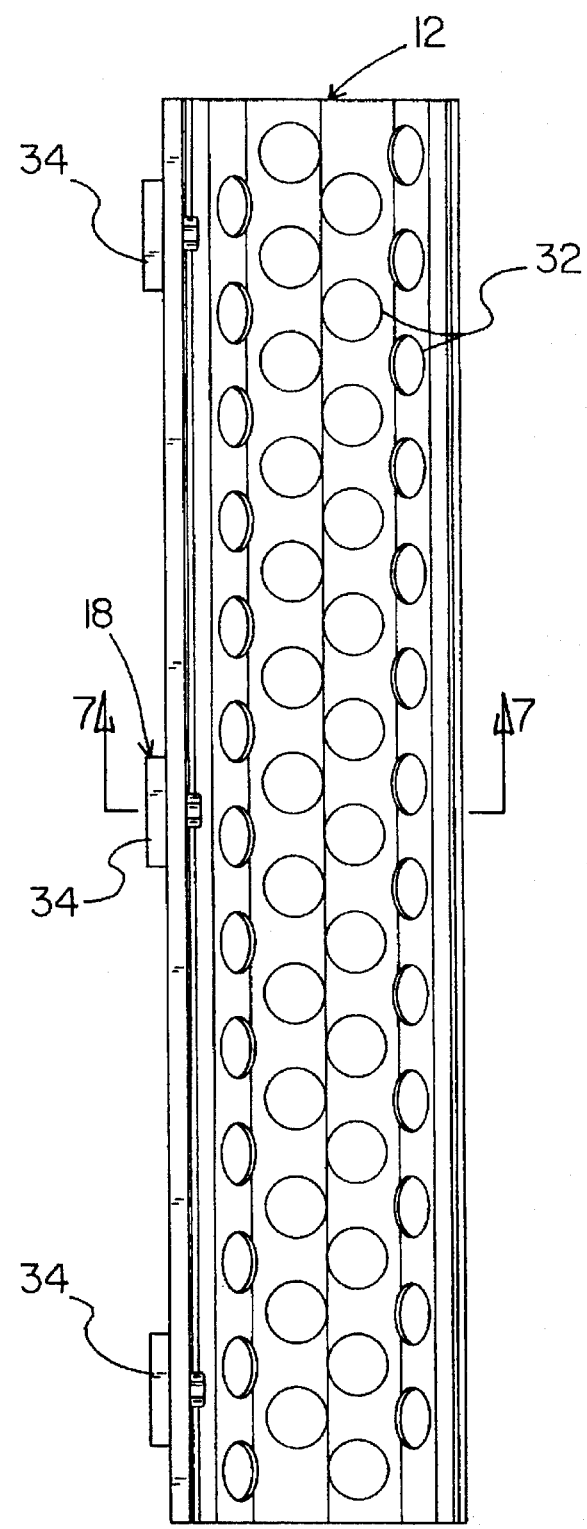
FIG. 4 is a top plan view of an alternative form of the invention.

As shown in FIGS. 3 and 4, the deflector panel 12 is preferably perforated to allow air currents to pass therethrough so as not to hinder movement of the blade structure 14 of the hedge trimmer 16 across a hedge during use of the device 10. FIG. 3 illustrates the panel 12 as comprised of a metallic mesh panel or screen, with FIG. 3 illustrating the panel as comprised of a plastic or polymeric panel having a plurality of venting apertures 32 directed therethrough.

Figure 5:
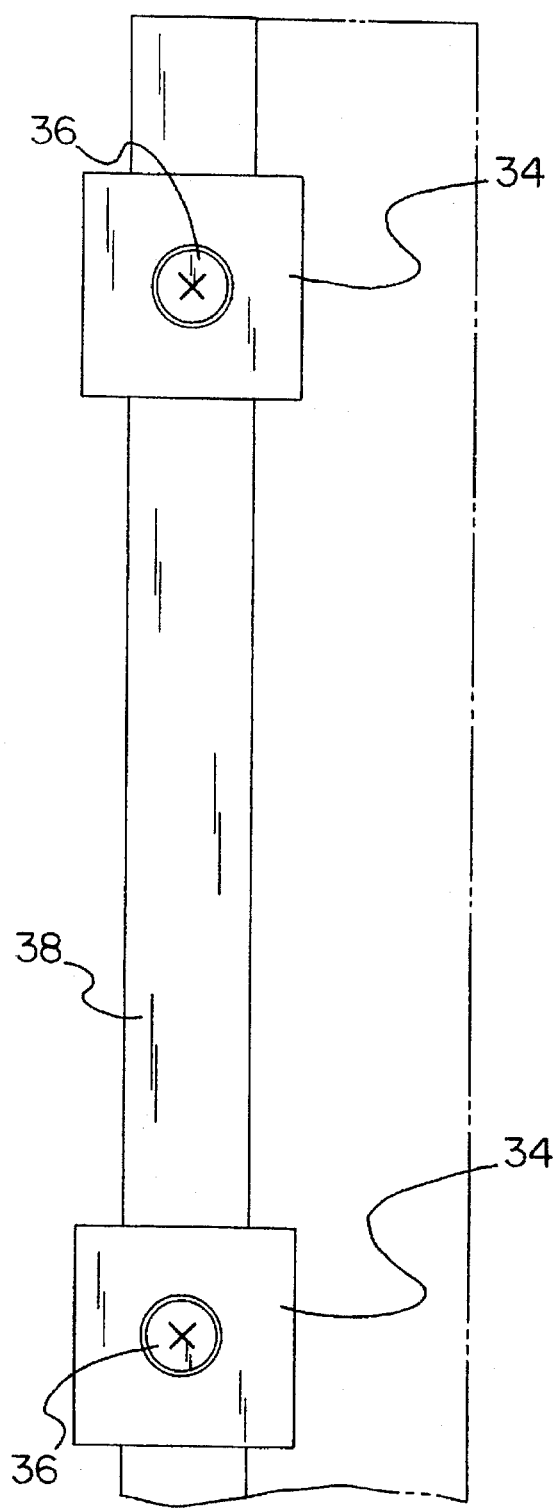
FIG. 5 is an enlarged side elevational view of an attaching means of the present invention.
Figure 6:
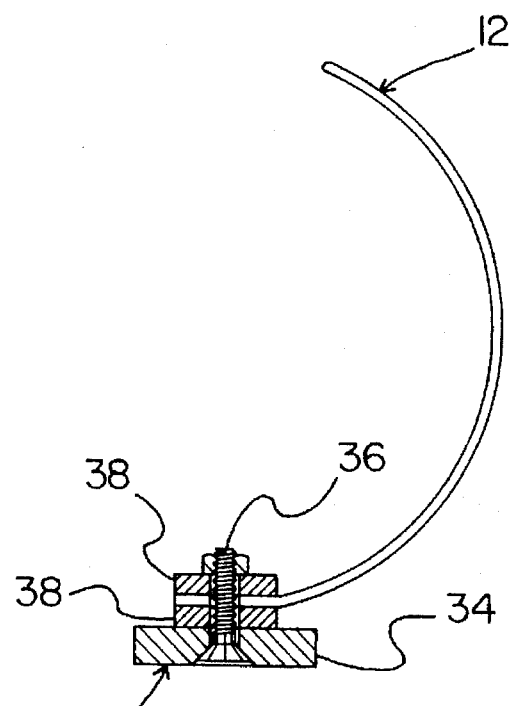
FIG. 6 is a cross sectional view FIG. 3.
Figure 7:
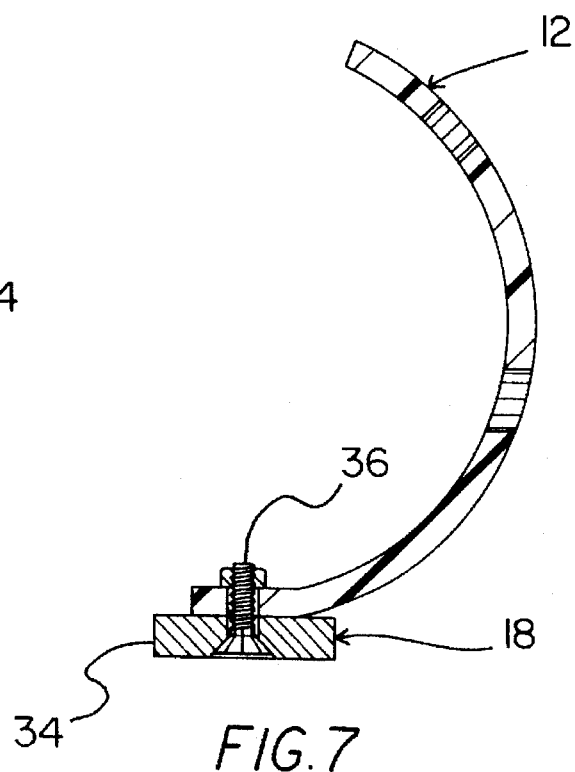
FIG. 7 is a cross sectional view FIG. 4.

Referring now to FIGS. 5 through 6, it can be shown that the attaching means 18 of the present invention 10 preferably comprises a plurality of high-strength magnets 34 which are secured along the lower longitudinal edge 20 of the deflector panel 12 by fasteners 36 such as screws or the like. If desired, the attaching means 18 may additionally comprise one or more reinforcing strips 38 extending along the lower longitudinal edge 20 of the panel 12 and secured thereto by the fasteners 36 to impart additional rigidity to the panel 12.

In use, the hedge trimmer debris guide 10 according to the present invention can be easily utilized for sweeping cut debris from a hedge. To this end, the hedge trimmer debris guide 10 can be easily and magnetically attached to an existing hedge trimmer 16 such that the deflector panel 12 extends along at least a portion of a longitudinal length of the blade structure of the trimmer. The trimmer can then be energized and used in a normal fashion, whereby debris cut by the trimmer or otherwise residing on the hedge being trimmed will be captured and retained within the deflector panel 12 for subsequent disposal thereof into an adjacent container or other desired area.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A debris guide for removable coupling to a hedge trimmer comprising:

a deflector panel positionable so as to extend along at least a portion of a longitudinal length of a reciprocating blade structure of a hedge trimmer, the deflector panel being formed in an elongated and arcuate structure having an upper portion curved inwardly so as to be axially aligned with a lower portion thereof, the deflector panel being perforated to allow air currents to pass therethrough, the deflector panel being comprised of a metallic mesh panel;

an attaching means coupled to the deflector panel for selectively securing to the blade structure so as to secure the hedge trimmer debris guide relative thereto whereby the upper portion of the deflector panel is curved above and over the blade structure to prevent debris from contacting a user, the attaching means comprises a plurality of magnets secured along the lower longitudinal edge of the deflector panel to facilitate easy removal from the hedge trimmer; and at least one reinforcing strip secured to and extending along the lower longitudinal edge of the panel.

* * * * *